UNITED STATES PATENT OFFICE 2,346,986

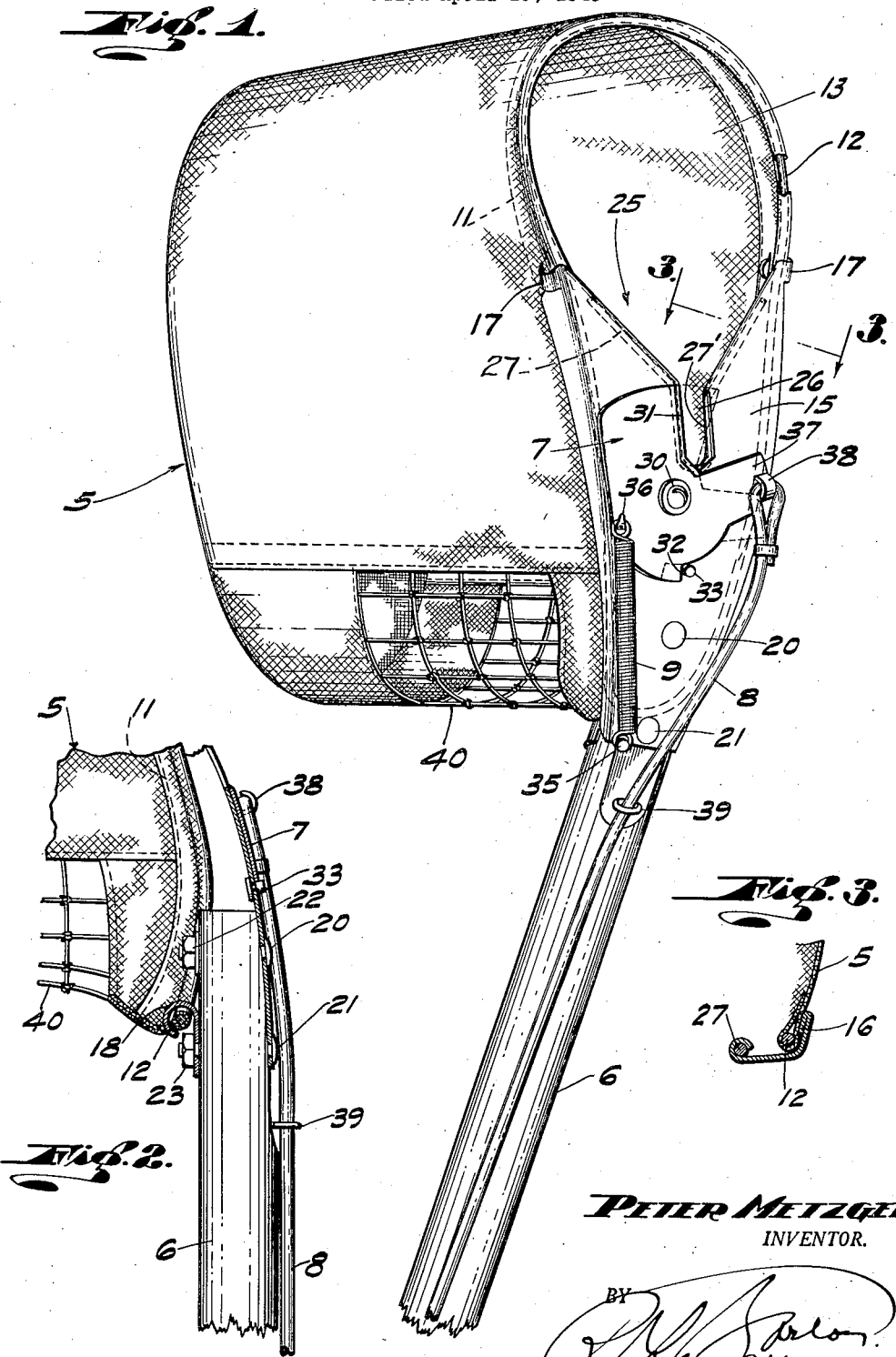

FRUIT CLIPPING DEVICE

Peter Metzger, Anaheim, Calif.

Application April 19, 1943, Serial No. 483,683

5 Claims. (Cl. 56—335)

The present invention relates to an improvement in devices for clipping fruit from trees.

An important object of the invention is to improve upon a similar device covered by Letters Patent #2,246,747 issued to me June 24, 1941.

Further important objects include in a device of the kind set forth:

Improved means for preventing nicking of the fruit incident to or during the clipping operation; improved means for aiding in separating clustered fruit incident to clipping an individual fruit; improved means for feeding the device through closely related foliage and fruit with less injury to the branches and the fruit; and to simplify and provide for faster and easier fruit picking operations.

Other objects, advantages and features of invention will be manifest from the description to follow and a study of the accompanying drawing wherein is shown a preferred embodiment of the invention as now reduced to practice.

In said drawing:

Fig. 1 is a perspective view of the device looking toward the front thereof, a portion of the handle and operating cord being broken away. In this view a dotted line indicates the position of the cutter's knife edge as it approaches the fruit stem severing position.

Fig. 2 is a fragmentary vertical cross section taken through the device at its mid-center, a portion of this structure being shown in side elevation.

Fig. 3 is a sectional detail taken on line 3—3 of Fig. 1.

Referring in detail to the drawing, the main parts of the device shown therein are the canvas containing bag 5, the pole or handle 6 which carries said bag, the cutter 7 for clipping off the fruit, the cord 8 for operating said cutter, and the spring 9 to restore said cutter to its normal position after each cutting operation.

The mouth portion of said bag 5 is inturned and stitched at 11 to enclose a wire loop 12 of a generally pear shaped character, the wide portion of which is directed away from the handle 6 to provide a sufficiently spacious and properly positioned intake opening 13 for the fruit being clipped from the tree. Said opening 13 has its wide part directed away from the handle 6. It need not be made any larger than required to admit the largest of the fruits to be mechanically picked.

Below the opening 13 the space bordered by the wire 12 is occupied by a mouth-piece plate 15, said plate having a backwardly directed flange 16 at each side furnished with ears 17 (two in the present embodiment) which grip the wire 12 to aid in detachably fastening on the bag 5, each flange being slit at the lower edge of its ear to facilitate formation of the latter. As a further attaching means for the bag a backwardly directed hook 18 secured to the back side of the handle 6 hooks backwardly over the lower part of the mouth of the bag including the wire 12, the bag being slitted at this point to admit hook. The portion of the mouth-piece plate between its flanges 16 is concavo-convex with its concave face directed backwardly in an overlying relation to the lower portion of the mouth of the bag 5. Said mouth-piece plate is shown attached to the front side of the upper portion of the handle 6 by means of two bolts 20 and 21, respectively furnished with nuts 22 and 23, the latter nut together with the bolt 21 serving to attach the aforesaid hook 18.

The mouth-piece plate 15 has in its upper side a downwardly tapered recess 25 the lower part of which has an extension 26 which forms a fruit stem receiving throat. A marginal stiffening wire 27 borders the recess 25 and is provided with a generally U-shaped lower portion 27' which extends along its throat portion 26. At least that side run of the wire portion 27' which is normally farthest from the edge portion of the cutter is located in a slightly inwardly exposed relation to the edge of this part of the face plate in order to prevent the fruits from becoming nicked by contacting directly with such edge, especially during the operation of the cutter.

The cutter blade 7 rocks about a pivot 30 and has a knife edge 31 at one side of said pivot and a stop shoulder 32 at the opposite side of said pivot. The mouth-piece plate 15 carries a stop 33 positioned, in cooperation with the spring 9, normally to position the cutter 7 with its cutting edge 31 substantially alining with the adjacent edge of the throat 26. Said spring 9 is shown having its lower end anchored to the handle 6 by a pin 35 and its upper end attached to the cutter 7 by an ear 36 carried by the latter.

The cutter 7 is provided with an operating arm 37 furnished with an ear 38 to which the cutter operating cord 8 is attached. Lower down the handle is shown carrying an eye bolt 39 through which said cord loosely plays.

The mouth-piece plate 15 is not only curved in the direction of the length of the pole 6, but is also curved from side to side, thus making it convex in front and concave behind as previously mentioned in relation to the flanges 16. The cutter plate 7 is correspondingly convexed with its concave side in an overlying relation to the mouth-piece plate, so that it cooperates efficiently therewith in performing fruit stem clipping operations. This dishing of the cutter plate both strengthens it and improves its operation.

The lower part of the front portion of the fruit-receiving sack 5 is provided with an open network of cords 40 which has the advantage of enabling the operator to see into the sack (until considerable fruit has been collected therein), and observe more clearly the position of each fruit being clipped off from the tree.

The attached lower end portion of the mouth-piece plate 15 is substantially flush with the front side of the pole or elongated handle 6, but said plate is backwardly curved upwardly from its attached part. The arcuate character of the mouth-piece plate thus provided, and related to supporting it in the manner stated, with its fruit stem receiving throat extending downwardly into its upper edge, affords more convenient access to the fruit to be cut and also enables the operator to clip it from the tree with less danger of the cutter nicking the flesh of the fruit being picked, and with greater rapidity.

By angularly supporting the pole so as to make it possible to see the outer face of the throat portion of the mouth-piece plate 15 when a fruit stem is about to be clipped the operator can more readily see when the device is properly positioned for performing a fruit stem severing operation. Also the backwardly curved relation of said mouth-piece plate in relation to the axis of the pole enables the operator to feed the mouth-piece plate backwardly over limbs to obtain access to fruit higher up in the tree.

In practice, the mean width of the throat 26 (which may slightly taper downwardly) will not be more than about three-fourths of an inch. This will insure that, in clipping off fruits like mature grapefruit, avocados and pears, only the stem portion of the fruits will be admittable into said throat. Owing to said throat being a narrowed, downward continuation of the downwardly tapering recess 25 in the upper edge of the mouth-piece plate, it is easy to guide into said throat the fruit stems to be clipped.

In Fig. 1 the bag 5 is shown in a fully extended position to disclose its capacity, but it is to be understood that in practice, the bag will sag down to a partly collapsed condition when the pole or handle 6 is held in an upstanding position.

Owing to the detachable manner in which the upper hooks 17 and the lower hook 18 (respectively shown in detail in Figs. 1 and 2) grip the wire 12, the canvas being slitted to admit said hooks, hence the bag may conveniently be detached from the pole 6, whenever that is desirable.

On account of the angular or backwardly curved relation of the mouth-piece plate to the axis of the pole 6, the fruit stem receiving throat 26 is positioned substantially in alinement with the back side of the pole and the bag 5 is carried by said mouth-piece plate in such a position that, as fruit accumulates in the bag the fruit is supportable upon the upwardly directed pole backwardly thereof in such a manner that objectionable tendency of the more or less filled bag to gravitate toward one side or the other when the device is in use is reduced to the minimum, the center of gravity of the said partly filled bag thus being maintained approximately vertically above the mid-length portion of the pole while the device is being used.

It should be understood that the present disclosure is for the purpose of illustration only and that this invention includes all modifications and equivalents which fall within the scope of the subject matter claimed.

What is claimed is:

1. A fruit clipping device comprising a pole forming a handle member thereof, a canvas bag to receive the clipped off fruit, a stiffening member whereby the mouth portion of said bag is maintained contoured to a pear shape which is arcuate in relation to its long axis, a mouth-piece plate attached to the mouth portion of said bag in an overlying relation to the narrower part of its pear shape, said mouth-piece plate where it overlies the narrower extremity of said pear shaped opening being attached to an end portion of said pole, said mouth-piece plate being concavo-convex so as to conform to the part of the bag's mouth to which it is attached and so as to bulge outwardly from said bag, there being a fruit stem receiving throat formed by a recess leading into the edge of the wider portion of said mouth-piece plate, a concavo-convex cutter plate pivotally secured to the outer face of said mouth-piece plate in a position to sever fruit stems occupying said throat, and a manually operable connection fastened to said cutter plate to perform fruit stem severing operations thereby.

2. In a fruit clipping device, a fruit-receiving bag having a mouth portion provided with marginal stiffening means whereby the mouth of the bag is maintained with a pear-shaped opening leading thereinto, a mouth-piece plate attached to said mouth portion of said bag in an overlying relation to the narrower portion of said pear-shaped opening and in a non-obstructing relation to the wider portion of said opening, leaving the latter part of said opening of the proper size to admit to the bag fruits to be clipped from the tree, said mouth-piece plate being concavo-convex with its concave face directed toward said bag, a pole to one end portion of which said mouth-piece plate is attached at an inclination to the axis of the pole and in such a position that it extends the length of the device upwardly from the top of the pole while the latter is being used in an upstanding position, said mouth-piece plate having a downwardly tapered recess extending across its upper portion when the device is positioned for use as aforesaid, the lower end of said recess having a narrowed downward extension forming a throat to receive the stems of fruits to be clipped from the tree, a cutter pivotally attached to said mouth-piece plate to sever fruit stems occuping said throat, and means for manually operating said cutter, said cutter plate being concavo-convex and having its concave face directed toward the convex face of said mouth-piece plate.

3. In a fruit clipping device, a pole forming a handle member, a sack mountable upon said pole and having an open-mouthed portion to admit fruits about to be clipped from trees, a mouth-piece plate attachable to the mouth portion of said sack and furnished with a throat dimensioned to admit only the stems of fruits about to be clipped off, a cutter plate rockably pivoted to said mouth-piece plate in an adjacent parallel relation thereto, said cutter plate having an operating arm and a cutting edge, a spring connected to said cutter plate whereby its cutting edge is normally held adjacent to one side of said throat, and an operating connection connected to said arm of said cutter plate to rock the latter against the opposition of said spring thereby to sever a fruit stem occupying said throat, said mouth-piece plate being concavo-convex with its concave side directed toward said sack and said cutter plate being concavo-convex corresponding to said mouth-piece plate, the concave face of said cutter plate being directed toward the convex face of said mouth-piece plate.

4. A fruit clipping device comprising a handle member, a mouth-piece plate having a fruit stem receiving throat leading into one of its sides, the opposite side portion of said plate being attached to said pole substantially flush with the front side of the latter when in use, said plate being attached in a position to extend the device in the direction of the length of said pole, said plate being curved toward the back side of the pole from the attached part of the plate throughout the part thereof occupied by its aforesaid throat, a manually operable fruit stem severing cutter mounted on said plate in a position to sever fruit stems occupying said throat, and a fruit receiving bag carried by said plate and extending from its back side, said bag having an open mouth portion located above said throat when the device is in an upstanding position to receive fruit preparatory to clipping it from the tree, said mouth-piece plate being forwardly convex in relation to its width as well as to its length and said cutter consisting of a concavo-convex plate pivoted to said mouth-piece plate with its concave face in an overlying conforming relation to the convex face of said mouth-piece plate.

5. A fruit clipping device comprising a handle member, a mouth-piece plate having a fruit stem receiving throat leading into one of its sides, the opposite side portion of said plate being attached to said pole in such a manner that the portion of said plate which is provided with said throat is spaced outwardly from the pole in an endwise relation to the latter and maintains said throat at a longitudinal inclination in relation to the axis of said pole, a manually operable fruit stem severing cutter mounted on said plate in a position to sever fruit stems occupying said throat, and a bag mounted upon the device in a position to receive the fruit severed from the tree by said cutter, said throat being sufficiently narrow to admit only the stem portions of the larger types of fruits being clipped from the tree by the device, said throat having a single exposed wire run at least one side thereof opposed to the cutting action of said cutter.

PETER METZGER.